(12) United States Patent  (10) Patent No.: US 8,959,901 B2
Mizuno et al.  (45) Date of Patent: Feb. 24, 2015

(54) METAL-GAS BATTERY SYSTEM

(71) Applicant: Toyota Motor Engineering & Manufacturing North America, Inc., Erlanger, KY (US)

(72) Inventors: Fuminori Mizuno, Ann Arbor, MI (US); Paul T. Fanson, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 102 days.

(21) Appl. No.: 13/872,438

(22) Filed: Apr. 29, 2013

(65) Prior Publication Data

US 2014/0318106 A1  Oct. 30, 2014

(51) Int. Cl.
*F01N 3/28* (2006.01)
*H01M 8/04* (2006.01)
*H01M 12/02* (2006.01)
*F01N 3/18* (2006.01)

(52) U.S. Cl.
CPC .......... *H01M 8/04201* (2013.01); *H01M 12/02* (2013.01); *F01N 3/18* (2013.01)
USPC ................... 60/301; 60/275; 60/288; 60/298; 60/320; 60/324

(58) Field of Classification Search
CPC ...... H01M 12/00; H01M 12/04; H01M 12/08
USPC .......... 60/275, 285, 286, 287, 288, 298, 299, 60/301, 320, 324; 429/402–407
See application file for complete search history.

(56) References Cited

U.S. PATENT DOCUMENTS

| 7,910,250 B2 | 3/2011 | Hsu et al. |
| 2011/0143226 A1 | 6/2011 | Pulskamp et al. |
| 2012/0040253 A1 | 2/2012 | Hermann |
| 2012/0094193 A1 | 4/2012 | Albertus et al. |

FOREIGN PATENT DOCUMENTS

| JP | 2011-70835 A | 7/2011 |
| WO | 2014/018842 A1 | 1/2014 |

*Primary Examiner* — Thomas Denion
*Assistant Examiner* — Jorge Leon, Jr.
(74) *Attorney, Agent, or Firm* — Christopher G. Darrow; Young Basile Hanlon & MacFarlane P.C.

(57) ABSTRACT

A metal-gas battery that utilizes an exhaust gas stream from a combustion engine as reactive gases is provided. Almost constant concentration of exhaust gases are supplied to the metal-gas battery via an existing engine systematic combustion system. The systematic combustion system keeps a definite air fuel mixture (A/F) that acts to enhance the fuel efficiency of the vehicle, and the metal-gas battery leverages the existing vehicle air management system. Exhaust heat of the exhaust gases is sometimes utilized for the heat control of the vehicle, and then the cooled exhaust gases are introduced into the metal-air battery to be consumed during a cathode reduction reaction to create and store electrical energy. The metal-gas battery supports the cleaning of exhausted gases using existing emission catalysts.

17 Claims, 3 Drawing Sheets

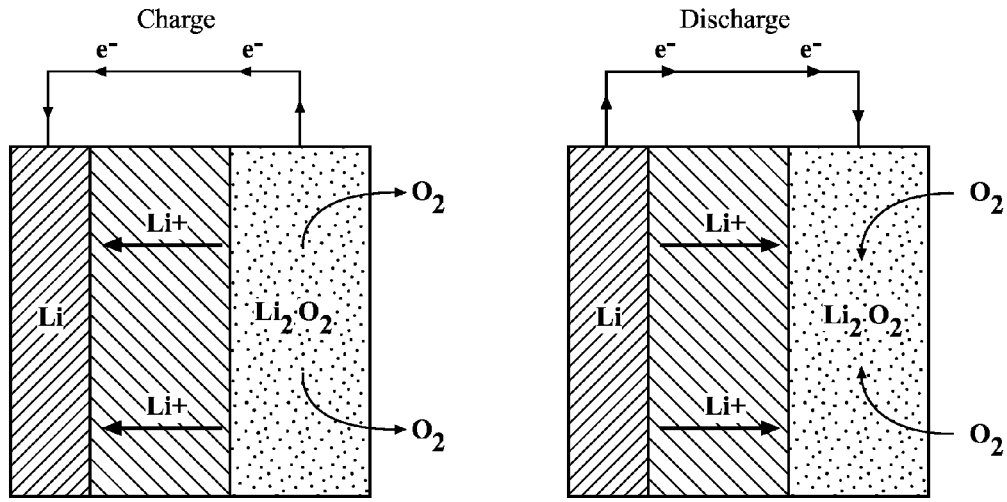
FIG. 1A
Prior Art
FIG. 1B
Prior Art
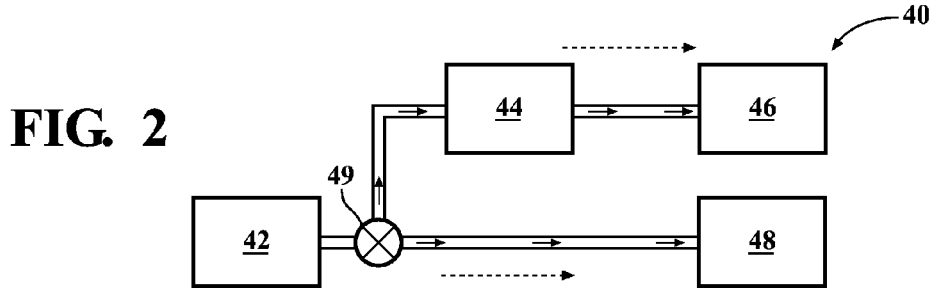
FIG. 2
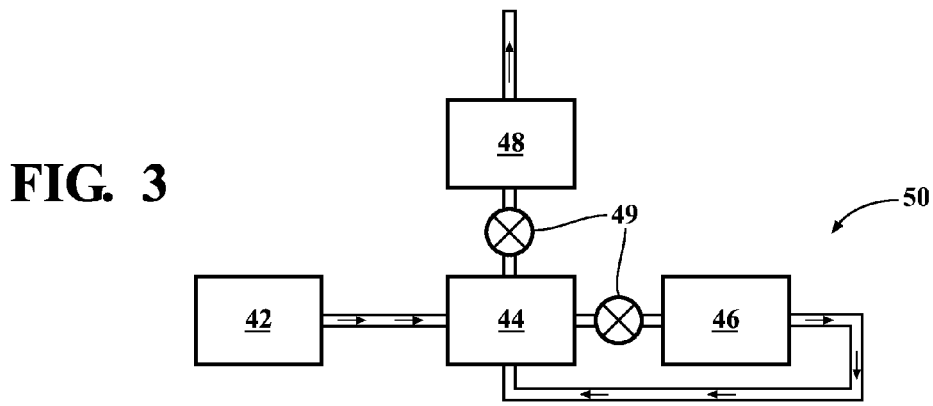
FIG. 3

METAL-GAS BATTERY SYSTEM

BACKGROUND

The present disclosure relates to batteries and in particular to metal-gas based batteries where reactive gases are supplied by a combustion engine.

Lithium (Li)-air batteries are a form of metal-air battery chemistry that uses the oxidation of lithium at the anode and reduction of oxygen at the cathode to induce a current flow. Li-air batteries have high energy density compared to other types of batteries. Energy density is a measure of the amount of energy a battery can store for a given volume, and the Li-air battery comes far closer than other types of batteries to that of traditional gasoline powered engines. Li-air batteries achieve a high energy density through the use of oxygen from the air instead of storing an oxidizer internally.

The relatively high energy density of Li-air batteries has made Li-air batteries an attractive candidate for use in automotive applications. The energy density of gasoline is approximately 13 kWh/kg, which corresponds to 1.7 kWh/kg of energy provided to the wheels of a vehicle when accounting for losses. The theoretical energy density of lithium-air batteries is 12 kWh/kg excluding the oxygen mass, with a corresponding theoretical practical energy density of 1.7 kWh/kg at the wheels of an automobile when accounting for over-potentials, other cell components, battery pack ancillaries, and the higher efficiency of electric motors versus combustion engines. Thus, Li-air batteries provide a similar capability to power a drive train of a vehicle as a gas powered combustion engine.

The operation of a lithium-air battery is generally characterized by lithium being oxidized at the anode forming lithium ions and electrons. The electrons follow an external circuit to do electric work and the lithium ions migrate across an electrolyte to reduce oxygen at the cathode. When an externally applied potential is greater than the standard potential for the discharge reaction, lithium metal is plated out on the anode, and oxygen $O_2$ is generated at the cathode. The reaction at the anode generated by electrochemical potential forces the lithium metal to give off electrons as per the oxidation. The half reaction is $Li \leftrightarrows Li^+ + e^-$. FIG. 1A illustrates the prior art charge cycle of a Li-air battery, with electrons traveling to the anode and oxygen being released at the cathode. FIG. 1B illustrates the prior art discharge cycle of a Li-air battery, with electrons leaving the anode and oxygen being absorbed at the cathode. Lithium has high specific capacity (3862 mAh/g) compared with other metal-air battery materials (820 mAh/g for Zinc, 2980 mAh/g for aluminum) making lithium an excellent choice for an anode material. At the cathode, reduction occurs by the recombination of lithium ions with oxygen. Currently, mesoporous carbon has been used as a cathode material with metal catalysts. Metal catalysts incorporated into the carbon electrode enhance the oxygen reduction kinetics and increase the specific capacity of the cathode. Manganese, cobalt, ruthenium, platinum, silver, or a mixture of cobalt and manganese are currently selected as metal elements of the catalysts, and their oxide, sulfide and cyclic compounds such as phthalocyanine are used in the cathode.

The Li-air cell performance is generally limited by the efficiency of reaction at the cathode because most of the cell voltage drop occurs at the cathode. Currently, multiple battery chemistry delineated by aprotic and aqueous electrolyte choice is employed in Li-air batteries, so the exact electrochemical reaction at the cathode varies between Li-air batteries. The aprotic design can include a lithium metal anode, a liquid organic electrolyte, and a porous carbon cathode, as a result, the main reaction chemistry is the deposition and decomposition of the insoluble lithium peroxide ($Li_2O_2$) or lithium oxide ($Li_2O$). The aqueous Li-air battery can include a lithium metal anode, an aqueous electrolyte, and a porous carbon cathode. The aqueous electrolyte is simply a combination of lithium salts dissolved in water. This is a different reaction chemistry from the organic electrolyte system, that is the precipitation and decomposition through a form of soluble lithium hydroxide (LiOH).

While metal-air batteries, such as Li-air batteries are a promising post lithium ion battery technology, and $Li-O_2$ versions of the battery are a promising candidate of high energy density type rechargeable batteries, the use of ambient air as a reactive gas instead of pure oxygen ($O_2$) gas causes the battery to have poor recharging characteristics. This is because $H_2O$ and $CO_2$ cause the inactivation of the reaction products such as $Li_2O_2$, $Li_2O$ and LiOH, that is the formation of $Li_2CO_3$, an inactive material for recharging. Ambient air including $O_2$ gas is the most attractive active material, however ambient air impurities, $H_2O$ and $CO_2$ degrade the huge advantage of $Li-O_2$ batteries. An approach to overcome the impurities from ambient air is purifying $H_2O$ and $CO_2$ from the ambient air with a form of air management to implement the gas purification. The complete gas management of impurities in ambient air is quite difficult even using state-of-the-art technology such as a gas separation membrane. Even though gas absorption technology using absorbents such as zeolite will eliminate most of the $H_2O$ and $CO_2$ from ambient air, such a gas absorption system would have to be quite large to completely eliminate the impurities. Therefore, complete ambient air purification is often not realistic for most battery applications.

Albertus et al. in U.S. Patent Publication 2012/0094193 discloses a high specific-energy $Li-O_2/CO_2$ battery where ambient air including $CO_2$ is introduced into Li-air batteries. In particular, a stoichiometric ratio of carbon dioxide ($CO_2$) to oxygen of 2:1 is most favorable to achieve high energy density as a primary battery. However, in the current living environment, it is very difficult to concentrate $CO_2$ gas up to the molar feed ratio of 2:1 relative to $O_2$, because in ambient air the quantity of $CO_2$ is about 0.03%, and a management system that maintains a constant $CO_2$ concentration is difficult to implement since the $CO_2$ concentration fluctuates in ambient air. Thus, for automobile use, the proposed battery is not realistic.

Thus, there exists a need for metal-air batteries that do not require complete purification of ambient air, and that are scalable for transportation and automotive applications.

SUMMARY OF THE INVENTION

A metal-gas battery system is disclosed herein that includes at least one metal-gas battery in communication with at least one exhaust gas stream such that the exhaust gas stream is introduced in the metal-gas battery in a manner that permits the introduced gas to be consumed during a catalytic reduction reaction to produce energy. The exhaust gas stream will contain at least one exhaust gas produced in a combustion engine. The energy produced in the metal-gas battery can be in the form of electrical energy.

The metal-gas battery system that is disclosed herein can be used in conjunction with a variety of mechanisms and power sources. Also disclosed herein is a combustion system that includes a metal-gas battery system that is configured to provide energy, particularly electrical energy, to at least one device. Also disclosed herein is a vehicle such as an automotive vehicle that includes an internal combustion engine, at least one emissions control device, at least one exhaust gas conduit and for conveying exhaust gas to at least one metal-gas battery system operatively connected to the automotive vehicle.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A and 1B illustrate the charge and discharge cycle of a typical Li-air battery;

FIG. 2 is a schematic of an inventive metal-gas battery system utilizing combustion exhaust from an internal combustion engine as a gaseous input to the metal-gas battery;

FIG. 3 is a schematic of another inventive metal-gas battery system utilizing combustion exhaust from an internal combustion engine as a gaseous input to the battery;

DETAILED DESCRIPTION

Figure 4:
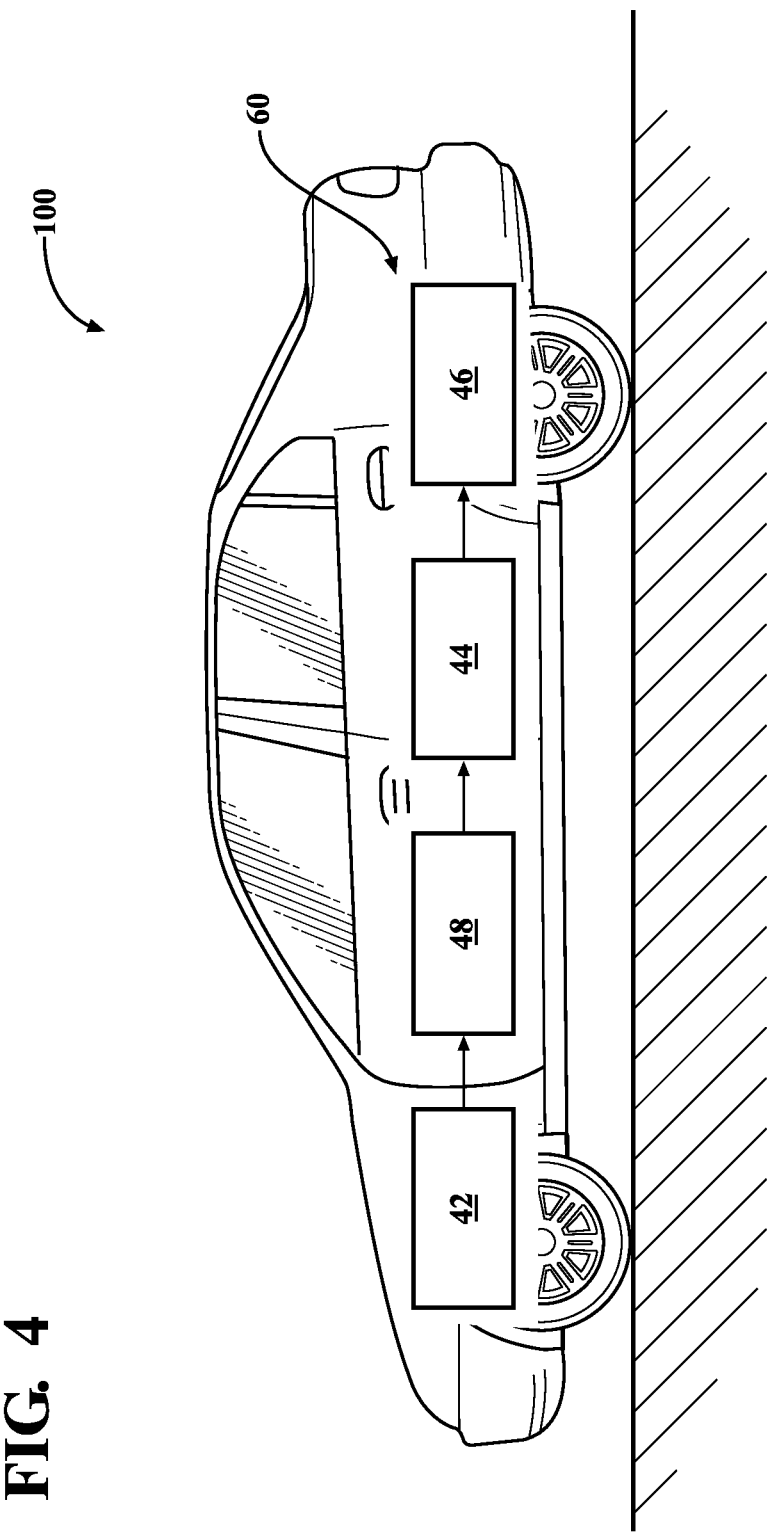
FIG. 4 is a schematic of another inventive metal-gas battery system utilizing combustion exhaust from an internal combustion engine after a catalytic treatment as a gaseous input to the battery in the context of a vehicle.

The present disclosure is directed as a device or system that utilizes "exhaust gases" from combustion engines such as internal combustion engines as the reactive gas or gases for a metal-gas battery. Non-limiting examples of suitable internal combustion engines include those in which a fuel is burned in a working fluid such as air. Suitable fuels include, but are not limited to petroleum products such as gasoline, diesel fuel and the like. The term "exhaust gas", as that term is used herein is taken to mean materials which are removed from the associated internal combustion engine after a combustion event. By way of non-limiting example, in four-stroke internal combustion engines, exhaust gas is that material that is forced out of one or more cylinders in the internal combustion engine by upward movement of the associated piston during the exhaust stroke phase of the cycle. The exhaust gas stream produced can include one or more gases that include, but are not limited to, one or more of the following: oxygen ($O_2$), nitrogen ($N_2$), carbon dioxide ($CO_2$), carbon monoxide (CO), water ($H_2O$), various short chain hydrocarbons (HC), mononitrogen oxides ($NO_x$), sulfur oxide products of combustion ($SO_x$). In various embodiments, it is contemplated that the exhaust gas that is supplied and utilized will be oxygen in combination with one or more target gases such as $CO_2$, CO, $NO_x$, $SO_x$, and HC. Herein, hydrocarbons (HC) mean methane, ethane, ethene, propane, propene, butane and butene.

As broadly construed, the present disclosure is directed to metal-gas battery system that includes at least one metal-gas battery that is in fluid communication with at least one exhaust gas stream. The metal gas battery will include at least one cathode. It is within the purview of the present disclosure that the metal-gas battery system, as disclosed herein, includes a plurality of battery units in any suitable arrangement or configuration. The cathode employed will be composed of a material (or materials) that facilitates a reduction reaction with the target gas or gases.

The system also includes at least one exhaust gas introduction mechanism that is configured to convey the exhaust gas into the metal-gas battery that permits a portion of the at least one target emission component to be consumed during a cathode reduction reaction to produce energy. In the embodiment as disclosed herein, the exhaust gas stream can be derived from one or more sources with at least a portion of the exhaust gas stream produced by an internal combustion engine. In various embodiments, it is contemplated that the internal combustion engine is associated with a moving vehicle such as an automotive vehicle. The metal-gas battery will be operatively connected to the moving vehicle to provide at least a portion of the electrical use requirements of the associated vehicle.

The internal combustion engine that is associated with the metal-gas battery system can be integrated into an associated combustion system. In automotive vehicles it is contemplated that the combustion system can include an exhaust gas exit that is located downstream of the internal combustion engine as well as any associated and ancillary devices. The combustion system can also include various conduit(s), valve(s) and the like to convey at least a portion of the exhaust gas stream toward the exit. The conduit(s) can be configured to maintain fluid communication between the metal-gas battery and the source of the exhaust gas stream. It is also contemplated that the combustion system can include at least one device that regulates the air-to-fuel (A/F) ratio or mixture of the fuel material supplied to the internal combustion engine. The air-to-fuel ratio can be regulated by one or more sensors and controllers in order to control and/or regulate at least one of engine performance, engine efficiency, fuel economy, emission content or any combinations of the foregoing. It is also contemplated that, in certain embodiments, the metal-gas system disclosed herein can be operatively linked to one or more A/F regulating devices to maintain a definite or steady A/F mixture. Operative linkage can be accomplished by devices such as sensors, diagnostic computational devices and the like. It is considered within the purview of the present disclosure that the metal-gas battery system can have suitable output devices that can communicate and interact with one or more calibration devices resident in the combustion system to produce an A/F mixture solution value that facilitates engine performance while reducing emissions and providing for battery performance.

The associated combustion system can include at least one target emission component removal/reduction device. Target emission component removal/reduction devices are ones that reduce or eliminate all or a portion of the target emission component from the associated exhaust gas stream. Removal or reduction, as that term is used in this context also includes, but is not limited to, sequestration, conversion of the target emission component to a more environmentally desirable compound, consumption of the target emission component, as well as combinations of the foregoing. Non-limiting examples of such devices include catalytic converters, recirculation valves and the like.

The metal-gas battery system disclosed herein is configured to function in tandem with the various target emission component removal/reduction devices to consume at least a portion of the target emission component in operation of the metal-gas battery. In certain embodiments, the target gas removal device can be configured to include at least one conversion catalyst. In such embodiments, at least one metal-gas battery can function in association with the conversion catalyst to reduce the concentration of the target emission compound or compounds in the exhaust gas stream prior to exit from the combustion system. As desired or required, the metal-gas battery can be positioned in tandem, upstream or downstream of the conversion catalyst.

In specific embodiments, almost constant concentration of exhaust gases including $O_2$, $N_2$, and one or more of the target gases such as $CO_2$, CO, $NO_x$, $SO_x$, HC and $H_2O$ are supplied to the metal-gas battery via the automotive vehicle's existing systematic combustion system. The systematic combustion system keeps or maintains a definite or steady air fuel mixture (A/F) that acts to enhance the fuel efficiency of the vehicle, and thereby the inventive metal-gas battery leverages the existing vehicle air management system.

In various embodiments of the metal-gas battery system disclosed herein it is contemplated that oxygen present in the exhaust gas stream can function as a trigger of multiple reactions. In still other embodiments, exhaust heat of the exhaust gases is first utilized for the heat control of the vehicle, and then the cooled exhaust gases are introduced in the metal-gas batteries to be consumed during a cathode reduction reaction to create and store electrical energy. In still other embodiments of the metal-gas battery, $O_2$ is reduced to from $O_2$ superoxideradical, $O_2$—, the radical that is formed can be reintroduced into the exhaust gas stream, to attack any reactive gases such as target emission components $CO_2$, CO, $NO_x$, $SO_x$, HC and $H_2O$, with the reaction product accumulated on cathode pores. Embodiments of the inventive metal-gas battery support the cleaning up of exhausted gases using emission catalysts. For example, carbon and transition metal oxide act to capture the exhaust gases inside the batteries, the batteries serving as part of the exhaust emission system.

In certain embodiments, the metal-gas battery may be composed of a metal anode, an electrolyte and a gas diffusion cathode. In certain embodiments, the material employed in the metal anode can be formed of a material suitable for the performance requirements of the associated battery. For example, anodes formed of lithium may be employed in certain high voltage generation applications, or alternatively other metals such as magnesium, aluminum, sodium, zinc and iron may be used for forming a low cost metal anode. In certain embodiments the electrolyte is composed of a combination of a couple of electrolyte materials including a solid electrolyte or a gel/polymer electrolyte. Furthermore, non-volatile electrolytes such as ionic liquids may be used in the electrolyte. In other embodiments of the metal-gas battery on the cathode side, it is preferable for the electrolyte to have a high tolerance for oxygen radicals. The cathode may be composed of carbon having a large porosity including high surface area and high pore volume, a catalyst formed from transition metal oxide and precious metal, and a binder. In an embodiment, a catalyst which absorbs the emission gases may be used.

The device as disclosed herein has utility as a metal-gas battery for use with internal combustion engines. Embodiments of the inventive metal-gas battery that utilize "exhaust gases" from internal combustion engines such as gasoline or diesel engines as reactive gases are provided. In certain embodiments, almost constant concentration or stream of exhaust gases including $O_2$, $N_2$, $CO_2$, CO, $NO_x$, $SO_x$, HC and $H_2O$ are supplied to the metal-gas battery via the vehicle's existing systematic combustion system. The systematic combustion system keeps a definite air fuel mixture (A/F) that acts to enhance the fuel efficiency of the vehicle, and thereby the inventive metal-gas battery leverages the existing vehicle air management system. The inventive metal-gas battery also benefits from the phenomena of a "fuel cut" for internal combustion engine vehicles. A fuel cut refers to the increase of oxygen concentration in the exhaust gas. In embodiments of the metal-gas battery system disclosed herein, oxygen can serve as a trigger of multiple reactions. In other inventive embodiments, exhaust heat of the exhaust gases is first utilized for the heat control of the vehicle or thermoelectric power generation, and then the cooled exhaust gases are introduced in the metal-gas batteries to be used up during a cathode reduction reaction to create and store electrical energy. In certain embodiments, the exhaust gases are cooled to below 80 degrees Celsius, while in other embodiments exhaust gas temperatures below 60 degrees Celsius will be produced prior to introducing the exhaust gas stream into the metal-gas battery.

In certain embodiments of the metal-gas battery as disclosed herein it is believed that $O_2$ in the exhaust gas stream is reduced to form the $O_2$ superoxideradical, $O_2^-$. The radical, once generated can react with one or more of the target emission components in the exhaust gas stream gases such as $CO_2$, CO, $NO_x$, $SO_x$, hydrocarbons (HC) and $H_2O$ to convert them to desirable reaction product(s) with the reaction product accumulated on cathode pores. As a result, certain embodiments of the inventive metal-gas battery induce the chemical modification of noxious exhausted gases to complement, or even eliminate the need for conventional emission catalysts such as dispersed platinum particulate devices. Without intending to be bound to a particular theory, it is believed that carbon and transition metal oxides in the battery act to capture at least some of the components of the exhaust gases inside the metal-gas battery or batteries, thereby allowing the battery to effectively serve as part of the exhaust gas emission system.

A metal-gas battery according to embodiments as disclosed can be a battery with a negative electrode or anode with a current collector separated from a positive electrode or cathode by a porous separator. An exemplary design and materials for a metal-gas battery is provided in J. Electrochem. Soc., 143 (1996)1-5 reported by K. M. Abraham et al. and J. Power Sources, 128 (2006) 1390-1393 reported by T. Ogasawara et al.

FIG. 2 is a schematic that shows one embodiment of an inventive metal-gas battery system generally at 40. An internal combustion engine 42 has an exhaust gas stream. Internal combustion engines operative herein include gasoline and diesel powered engines. The exhaust gas stream is passed through a heat controller 44 that operates to reduce the temperature of the exhaust gas stream. Heat controller 44 can include any suitable heat exchanger device. In certain inventive embodiments, the heat controller includes a thermoelectric device that produces electricity in the process of reducing the temperature of the exhaust gas stream. When an exhaust gas stream is cooled to a temperature of less than 80 degrees Celsius, and in some instances less than 60 degrees Celsius, the exhaust gas stream can be brought into fluid communication with one or more metal-gas batteries 46.

In some embodiments, a catalytic unit 48 can be provided to react at least a portion of certain components of the noxious exhaust gas that is exiting from the heat controller 44, the battery 46, or a combination thereof. It is appreciated that sensors are readily provided to adjust the operation of the internal combustion engine 42 to modify the exhaust gas mixture for improved operation of the battery 46. By way of example, the air/fuel ratio can be modified to improve battery operation. Through inclusion of a valve 49 positioned intermediate between 42 and 48, the relative flow of exhaust gas between 44 and 48 is controlled; the stream denoted as arrows in FIG. 2.

FIG. 3 is a schematic that shows another embodiment of a metal-gas system as disclosed herein. The metal-gas system is shown generally at 50, where like numerals used with respect to FIG. 2 have the same meaning as ascribed to those terms above. Exhaust gas from the internal combustion engine 42 is communicated to heat controller 44, heat controller 44 being in simultaneous fluid communication with the battery 46 and the catalytic unit 48. In some embodiments of system 50, a feedback loop is provided that feeds gas that has reacted with the metal-gas battery or batteries to the heat controller 44. Through inclusion of at least one valve 49 positioned intermediate between 44 and 48, between 44 and 46, or in both locations, the relative flow of exhaust gas in system 50 is controlled.

FIG. 4 is a schematic that shows another embodiment of a metal-gas system as disclosed herein in the context of a vehicle carrying the metal-gas system shown generally at 60, where like numerals used with respect to FIG. 2 have the same meaning as ascribed to those terms above. Exhaust gas from the internal combustion engine 42 is communicated to the catalytic unit 48 and the catalytically treated exhaust gas is then communicated to the heat controller 44 with the cooled engine exhaust to the battery 46. An automotive vehicle 100 that has an internal combustion engine 42 producing an exhaust gas. Non-limiting examples of an automotive vehicle 100 include cars, aircraft, marine vehicles, off road vehicles, heavy trucks and construction vehicles and the like. In the embodiment depicted in FIG. 4, the automotive vehicle 100 is a car.

The electrical energy produced by the at least one metal-gas battery can be directed to any suitable device or devices associated with the automotive vehicle 100. Non-limiting examples of such electrical devices include various devices located in the passenger compartment such as on-board entertainment system, lights and the like (not shown). The electrical output of the metal-gas battery can also be directed to one or more rechargeable storage energy storage devices located on the moving vehicle (not shown). These rechargeable energy storage devices can include but are not limited to batteries powering drive mechanisms, secondary storage batteries and the like.

It is also within the purview of this invention that the metal-gas battery system as disclosed herein can be configured as an assembly or subassembly that can be integrated into a moving vehicle either during initial vehicle assembly or as an aftermarket activity.

The present invention is further detailed with respect to the following non-limiting examples that are provided to further illustrate the preparation of specific inventive compositions and certain attributes associated with the resulting films on substrates.

Example 1

A lithium-gas cell was fabricated with the following units in an argon filled glove box. The cell was obtained from a traditional coin-type cell with air holes. The anode was Li metal (high purity), 100 microns in thickness. As an anode current collector, a stainless steel spacer was used that was 19 mm in diameter. The electrolyte was 1M $LiPF_6$/EC-DEC (3:7 in volume). A separator was formed of glassfiber, 435 microns in thickness. In the cathode, the $K^+$ stabilized $\alpha$-$MnO_2$ was mixed with Ketjen Black in EtOH to produce a homogeneous mixture that was dried to remove the EtOH. PTFE was mixed with the above-prepared mixture; and the resultant mixture formed as a sheet. Carbon paper was used as a cathode current collector. Various dry test gases were introduced at a constant flow rate of 5 L/min in total for 10 min, and then Ar gas was completely replaced.

Figure 5:
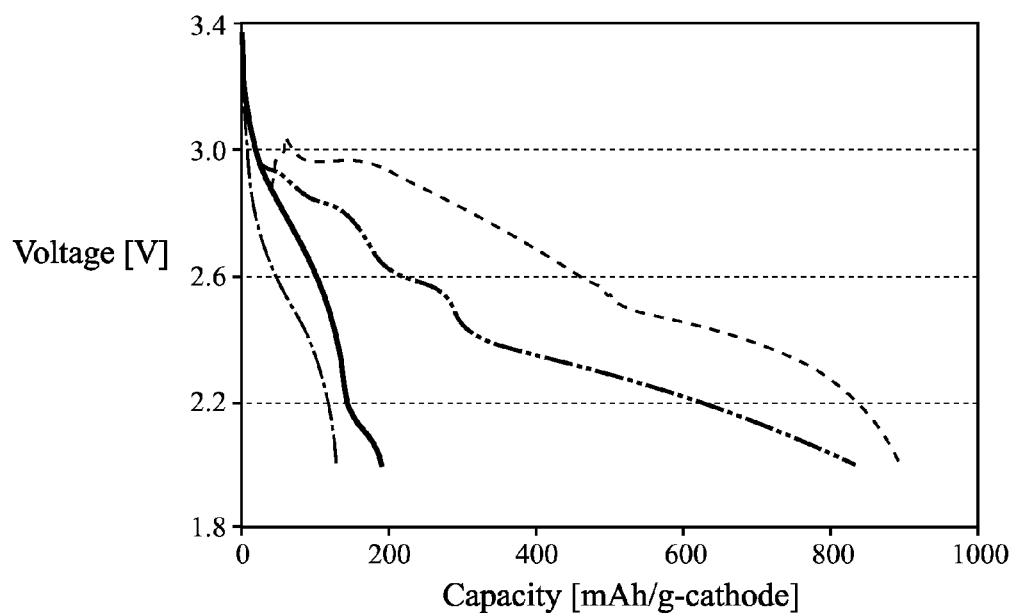
FIG. 5 is a graph of voltage versus capacity for an embodiment of a Li-gas battery with an electrolyte of 1 mol/L $LiPF_6$, ethylene carbonate/diethyl carbonate (EC-DEC) for various inputted reactive gases in which the innermost curve to the graph origin is for pure argon input gas, followed successively in capacity by $O_2/N_2/CO_2$ at 1/84/15 volume percent, $O_2/N_2$ at 20/80 volume percent; and $O_2/N_2/CO_2/CO/NO/HC$ at 1/80/14/2/2/1 volume percent.

Data was collected and the results are shown in FIG. 5 in which the innermost curve to the graph origin is for pure argon input gas, followed successively in capacity by $O_2$/$N_2$/$CO_2$ at 1/84/15 volume percent, $O_2$/$N_2$ at 20/80 volume percent; and $O_2$/$N_2$/$CO_2$/CO/NO/HC at 1/80/14/2/2/1 volume percent. FIG. 5 illustrates the improved performance obtained for an exemplary metal-gas battery is achieved by using combustion emissions, as compared to conventional gas feedstocks.

Example 2

Figure 6:
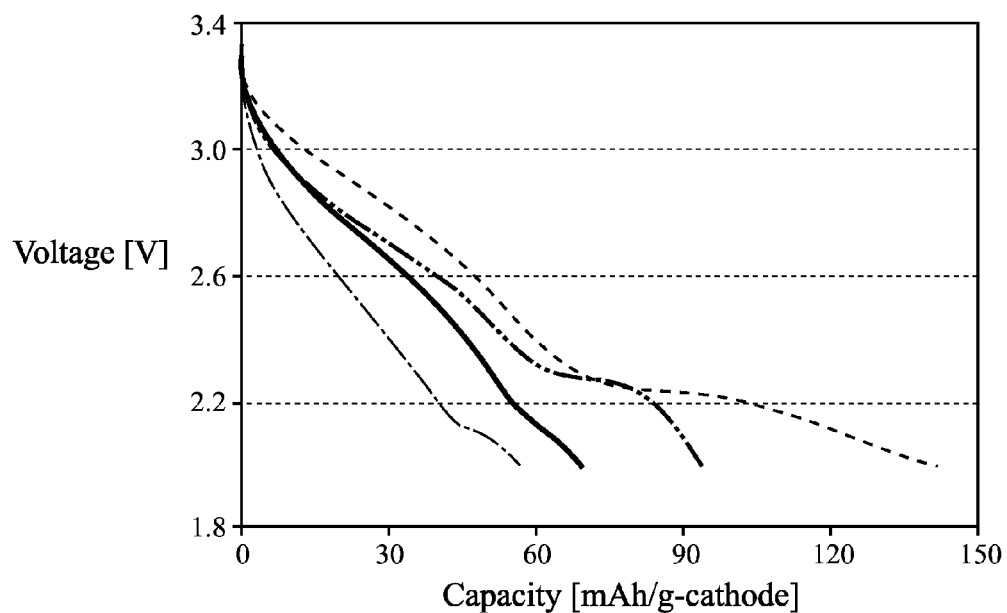
FIG. 6 is a graph of voltage versus capacity for an embodiment of a Li-gas battery with an electrolyte of 0.32 mol/kg Lithium bis(trifluoromethanesulfonyl)imide (LiTFSI) in the ionic liquid N,N-Diethyl-N-methyl-N-(2-methoxyethyl)ammonium bis(trifluoromethansulfonyl)imide (DEMETFSI) for the same gaseous inputs shown in FIG. 4.

The process of Example 1 was repeated with the electrolyte instead being 0.32 mol/kg Lithium bis(trifluoromethanesulfonyl)imide (LiTFSI) in the ionic liquid N,N-Diethyl-N-methyl-N-(2-methoxyethyl)ammonium bis(trifluoromethansulfonyl)imide (DEMETFSI). The results are shown in FIG. 6 in which the innermost curve to the graph origin is for pure argon input gas, followed successively in capacity by $O_2$/$N_2$/$CO_2$ at 1/84/15 volume percent, $O_2$/$N_2$ at 20/80 volume percent; and $O_2$/$N_2$/$CO_2$/CO/NO/HC at 1/80/14/2/2/1 volume percent. It is noted that the viscosity of the electrolyte in this example is greater than that of Example 1. As with Example 1, improved performance obtained for an exemplary metal-gas battery is achieved by using combustion emissions, as compared to conventional gas feedstocks.

Patents and publications mention the specification are indicative of the levels of those skilled in the art to which the invention pertains. These patents and publications are incorporated herein by reference to the same extent as if each individual patent or publication was specifically and individually incorporated herein by reference.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A metal-gas battery system comprising:
    at least one metal-gas battery in fluid communication with an exhaust gas stream derived at least in part from an internal combustion engine and having at least one target emission component;
    wherein the exhaust gas stream is conveyed into the at least one metal-gas battery in a fashion that permits a portion of the at least one target emission component to be consumed during a reduction reaction of a cathode to produce energy; and
    wherein the at least one target emission component comprises $O_2$ and at least one of $CO_2$, CO, $NO_x$, $SO_x$, and hydrocarbon.

2. The metal-gas battery system of claim 1 further comprising a heat exchanger in fluid communication with the exhaust gas stream, the heat exchanger positioned downstream of the combustion engine and upstream of the at least one metal-gas battery.

3. The metal-gas battery system of claim 1 wherein the energy produced is electrical energy.

4. The metal-gas battery system of claim 3 wherein the internal combustion engine is part of a combustion system; and wherein the combustion system maintains a steady air fuel mixture (A/F).

5. The metal-gas battery system of claim 1 further comprising a catalytic converter.

6. The metal-gas battery system of claim 5 wherein the catalytic converter is in tandem with the at least one metal-gas battery.

7. The metal-gas battery system of claim 5 wherein the catalytic converter comprises an adsorption catalyst with respect to the at least one target emission component of the exhaust gas stream.

8. The metal-gas battery system of claim 1 wherein the at least one metal-gas battery comprises a metal anode, an electrolyte, and wherein the cathode is a gas diffusion cathode.

9. The metal-gas battery system of claim 8 wherein the metal anode is formed of at least one of lithium, magnesium, aluminum, sodium, zinc, or iron and wherein the electrolyte is composed of a combination of at least one electrolyte material of a solid electrolyte, a gel/polymer electrolyte, nonvolatile electrolytes, or ionic liquids.

10. The metal-gas battery system of claim 1 wherein the cathode comprises at least one material that supports reduction of $O_2$ to a superoxide radical, $O_2^-$, the superoxide radical $O_2^-$ reacting with the exhaust gases to form a reaction product, the reaction product accumulated on a set of pores present on the cathode.

11. The metal-gas battery system of claim 10 wherein the cathode is composed of carbon having a large porosity including high surface area and high pore volume; a catalyst formed from a transition metal oxide and a precious metal; and a binder.

12. The metal-gas battery system of claim 10 wherein an exterior portion of the cathode has a current collector layer and a gas permeation film layer that allows a bidirectional flow of gas to enter or exit the metal-gas battery.

13. The metal-gas battery system of claim 1 further comprising a valve for selectively controlling the fluid communication between the internal combustion engine and the at least one metal-gas battery.

14. An automotive vehicle comprising:
an internal combustion engine operable to produce an exhaust gas stream;
an exhaust gas conduit in fluid communication with the internal combustion engine and operable to direct flow of the exhaust gas stream;
at least one metal-gas battery in-line with the exhaust gas conduit and positioned to receive at least one component of the exhaust gas stream directly or indirectly from the internal combustion engine; and
a catalytic converter in-line with the exhaust gas conduit and positioned to receive at least a portion of the exhaust gas stream from the internal combustion engine, to receive at least a portion of the exhaust gas stream from the at least one metal-gas battery, or both;
wherein the at least one metal-gas battery is configured to produce electrical energy, the electrical energy derived at least in part from a reduction reaction occurring at a cathode of the at least one metal-gas battery, wherein the reduction reaction consumes a portion of at least one component of the gas exhaust stream; wherein the at least one component of the gas exhaust stream includes $O_2$ and at least one of $CO_2$, CO, $NO_x$, $SO_x$, and hydrocarbon; and wherein the catalytic converter includes at least one emission catalyst.

15. The automotive vehicle of claim 14 wherein the cathode of the at least one metal-gas battery is composed of carbon having a large porosity including high surface area and high pore volume; a catalyst formed from a transition metal oxide and a precious metal; and a binder.

16. The automotive vehicle of claim 14 further comprising a valve positioned in the exhaust gas conduit for selectively controlling fluid communication between the internal combustion engine and the at least one metal-gas battery.

17. An emissions-control device for an automotive vehicle having an internal combustion engine, the emissions control device comprising;
at least one metal-gas battery in fluid communication with an exhaust gas stream produced by the internal combustion engine, the exhaust gas containing at least one target emission component including $O_2$ and at least one of $CO_2$, CO, $NO_x$, $SO_x$, and hydrocarbon; each of the at least one metal-gas battery having a cathode; and
at least one exhaust gas stream conduit configured to convey the exhaust gas stream into the at least one metal-gas battery such that a portion of the at least one target emissions component is consumed during a cathode reduction reaction at the cathode to produce energy.

* * * * *